Oct. 1, 1963
J. H. BERTIN ETAL
3,105,388
TORQUE CONVERTER
Filed Oct. 8, 1956
2 Sheets-Sheet 1
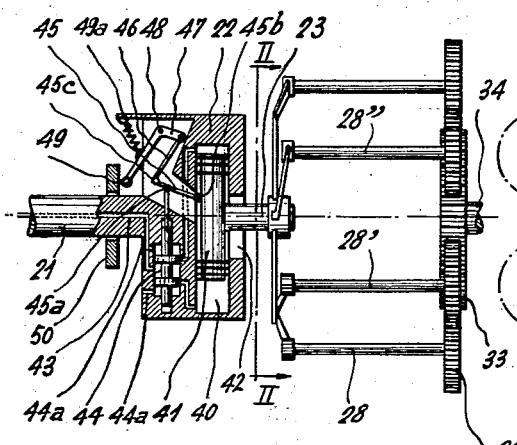
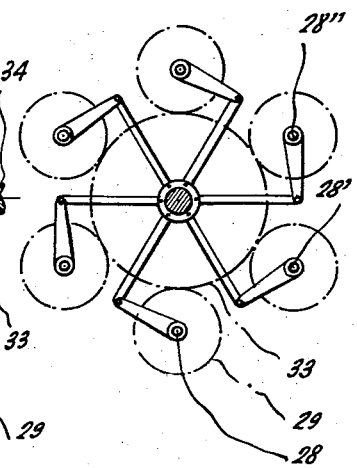
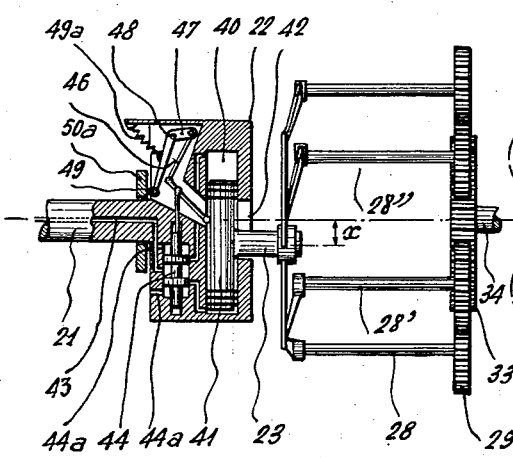
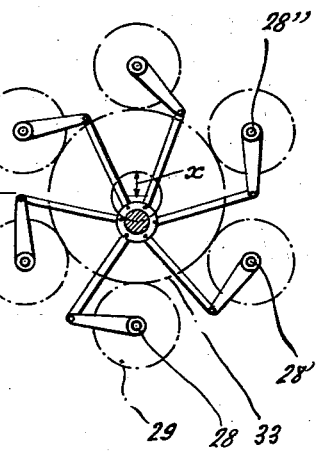
INVENTORS
JEAN H. BERTIN
BENJAMIN J. M. SALMON
By
*Watson, Cole, Grindle & Watson*
ATTORNEYS

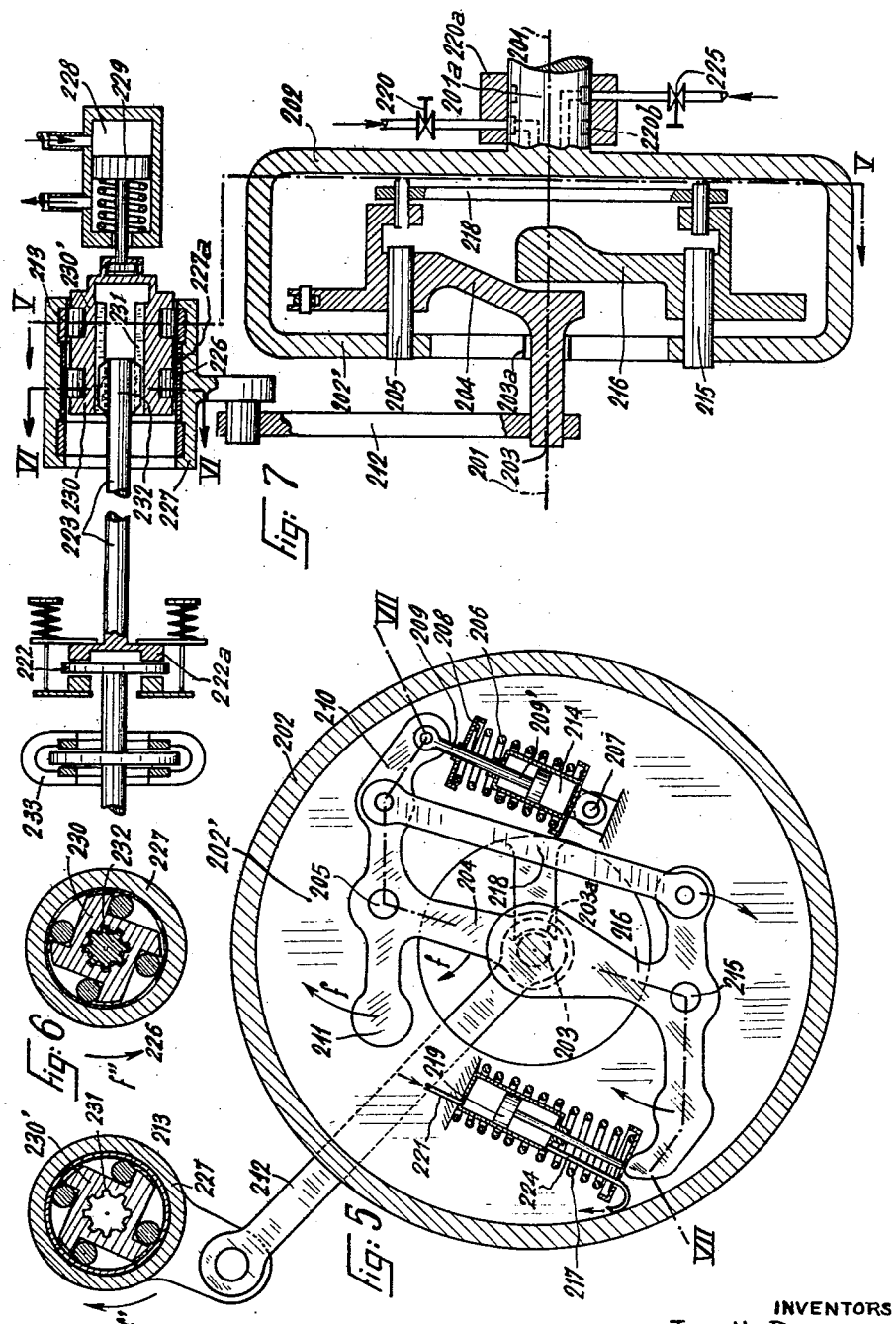

United States Patent Office 3,105,388
Patented Oct. 1, 1963

3,105,388
TORQUE CONVERTER
Jean H. Bertin, Neuilly-sur-Seine, and Benjamin J. M. Salmon, Suresnes, France, assignors to Societe Bertin & Cie (Societe a Responsabilite Limitee), Paris, France, a company of France
Filed Oct. 8, 1956, Ser. No. 614,733
Claims priority, application France Oct. 8, 1955
7 Claims. (Cl. 74—113)

The present invention relates to a torque converter which is closely related to alternating transmissions with variable travel, in which apparatus the driving movement is first transformed from the continuous rotating form in which it is generally supplied, to an alternating movement which, by virtue of a free wheel system, is re-converted to a continuous rotating motion having a different torque.

This apparatus may be arranged in such manner that the step-down gearing ratio varies automatically in the reverse sense to the resistant torque, and a large number of solutions have already been proposed to this end, since in principle it is only necessary for a member sensitive to the resistant torque: for example a spring, cams, or the relative angular displacement of members having different inertias, to record the reaction of the receiving apparatus in order that this elastic member may serve to regulate the travel of the alternating motion in accordance with the value of the torque to be overcome.

In all the known devices however, the elastic system is never subjected to any torque other than the average resistant torque and takes up an average deformation. It follows that, if the trajectories of the driving members and the driven members do not follow the same law in time, the points of contact which transmit the movement and the members themselves are subjected to considerable momentary stresses which threaten their very existence.

In the device in accordance with the invention, the coupling between the crank or other member which generates an alternating motion on the one hand and the receiving member on the other hand, is not rigid but comprises an elastic member so that the torque applied to the receiving member automatically increases in the opposite direction to the speed of rotation of the driven shaft.

In this way, the system approaches the elastic ideal system with zero inertia up to the receiving member, in which the difference between the laws in time at the input and at the output of the system is entirely compensated by elastic deformation.

The invention will be more clearly understood by referring to the description which follows below with reference to the accompanying drawings, these being given by way of example only and not in any sense by way of limitation.

One form of construction which is especially advantageous comprises a member which generates an alternating motion which is progressively regulatable between two limits corresponding respectively to a zero or small amplitude of the alternating motion and to a maximum amplitude. In controlling the regulation of the said generator of the alternating motion as a function of a suitable parameter, for example the speed of the driving shaft, it is possible to obtain a torque converter or a progressive change of speed which operates automatically. Such an apparatus even enables all clutch devices to be dispensed with between the motor and the receiver.

The automatic regulation of the member which generates the alternating motion may preferably be controlled by centrifugal action, in particular by means of weight-heads driven in rotation by the driving shaft.

FIGURE 1 is a side elevation, partly in axial section, of a device constructed in accordance with the invention;

FIGURE 2 is a transverse section on line II—II of FIGURE 1;

FIGURES 3 and 4 are views corresponding to FIGURES 1 and 2 showing the apparatus in the position of maximum eccentricity;

FIGURES 5, 6 and 7 relate to a further form of embodiment in which the eccentricity of the crank-pin which generates the alternating motion is progressively variable as a function of the speed of rotation of the driving shaft; FIG. 5 is a transverse cross-section following the line V—V of FIG. 7; FIG. 7 is an axial cross-section along the line VII—VII of FIG. 5, and FIG. 6 is a cross-section of the second free wheel in the plane VI—VI of FIG. 7.

FIGURES 1 and 2 show the entry or driving shaft 21, the rotation of which is continuous, and a crank-pin 23 on which the crank-arms 24 are pivoted. Each of the latter is rigidly keyed on one of the extremities of a torsion bar 28, 28', etc., the other end of which is rigidly fixed to a pinion 29 with an internal free wheel. This latter engages with the wheel 33 which is fixed to the driven or output shaft 34 and which will thus rotate with variable speed and torque.

This arrangement has a number of advantages; the first is essentially bound up with the principle of the torque converter. With a constant radius of crank and a constant input power on the driving shaft, the adaptation of the torque to the speed of rotation of the output shaft is automatic. In fact, the higher the value of the resistant torque, the greater the prior torsion of the bar and the smaller is the angle through which the output shaft is driven. There is no loss of energy since the torsion bar restores its initial strain on the entry shaft as soon as the dead centre of the transmission is passed.

The second advantage resides in the considerable improvement in the conditions of working of the free wheels. Whilst in the other known systems, there is a percussion effect on engagement, in this case there is none at all. The core of the free wheel, when it catches up the external ring which rotates at substantially constant speed driven by the receiver pinion, can only transmit a torque proportional to the torsion of the bar and this is zero when starting. There is thus no excessive stress on engagement and thus the performance of the system in respect of long life is ensured.

In the form of embodiment shown in FIGS. 1–4, a number of transmitters of the type previously described are arranged in parallel.

The driving shaft 21 carries the crank-pin 23 which generates the alternating motion and has an eccentricity $a$. By virtue of the six torsion bars 28, 28', 28" . . ., the torque transmitted by the cranks 24, 24', 24" . . . to the wheels 29, 29', 29" . . . to the common wheel 33 and to the driven shaft 34 is more uniform and its value may be greater with a smaller overall space. In addition, in FIGS. 1–4, the radius of generation $x$ of the alternating motions is variable. This parameter may be either at the disposal of the driver of the apparatus (driver of the vehicle for example) or it may be controlled in dependence on any variable which may be considered useful, such as the speed of the motor or the speed of the vehicle.

The regulation of the eccentricity of the crank-pin enables a progressive clutch to be obtained together with a regulation of the torque taken from the generator of energy.

In the form of embodiment shown, the crank-pin 23 is carried by a piston 41 which moves inside a cylindrical diametral cavity 40 of the fly-wheel 22. The crank-pin slides in a slot 42 of the fly-wheel 22 when the piston 41 is displaced under the action of oil under pressure arriving through the central channel 43 of the shaft 21. The oil terminates at a distributor which sends it to one side or the other of the piston 41. The leakage channels 44a of the distributor have been shown as delivering to the exterior, in order to make matters simpler. The piston rod of the distributor 44 is coupled (with a possibility of sliding) to a point 45a of a rod 45, one extremity of which is pivoted at 45b on the piston 41, the other extremity being pivoted at 45c with a second rod 46 terminating in one of the limbs of a cranked lever 47 which can pivot about a relative fixed point 48 situated on the fly-wheel 42. The other arm of the cranked lever carries at its extremity 49 a roller which is held by a spring 49a in contact with a control ring 50 which is free to move laterally and which can take up either the position 50 shown in FIG. 1, or the position 50a of FIG. 3.

If the rod system and the piston are in the neutral position, as shown in FIG. 1 (zero eccentricity of the crank-pin) and the control ring 50 is moved towards the right, the piston of the distributor will be drawn towards the inside of the fly-wheel. Under the pressure of the oil passing into the cylinder, the piston 41 will move towards the exterior and the eccentricity $x$ of the crank-pin will be increased.

The displacement of the piston 41 which can take place because, in the time during which the oil under pressure passes in to one side of the piston 41, the other side may pass out through that of the channels 44 which is put into communication with this side by the distributor piston 44, ceases as soon as this distributor piston 44 is brought back into its neutral position by the control rod-system.

To sum up, to each position of the ring 50 there will correspond a well-defined and stable value of the eccentricity $x$ of the crank-pin.

It will be observed that the elastic system in accordance with the invention, whether it is constituted by torsion bars, or by other elastic means, lends itself to a construction in which the elastic deformations follow a law which, within certain limits, can be laid down in advance. It is for example possible to use multiple torsion bars having successive actions.

In FIGS. 5 and 7, 201a is the shaft of the engine having an axis 201, on the end of which is mounted the fly-wheel 202, the inside of which is hollow. On one of its faces 202', the fly-wheel carries a shaft 205 on which can oscillate an arm 204 extending towards the axis of the fly-wheel and terminating at the crank-pin 203. The arm 204 has a length corresponding to the distance between the axes 201 and 205.

A spring 206 supported by a pivot 207 fixed on one of the faces 202' of the fly-wheel applies a thrust against a cup 208 carrying a rod 209 pivoted on the extremity of a cranked extension 210 of the arm 204. The spring 206 is arranged so as to bring, in the position of rest, the crank-pin 203 against an abutment 203a such that the axis of the crank-pin 203 then coincides with the axis 201 of the driving shaft 201a.

The arm 204 carries, opposite the arm 210, a further crank extension 211 which forms a weight-head. The position of rest determined by the spring 206 and the abutment 203a, together with a suitable arrangement of the weights, and in particular of the extension 211, cause the centre of gravity of the moving assembly 204, 210, 211 to be outside the line which joins the axes 201 and 205 (to the left of this line in FIG. 5). Under the action of centrifugal force, when the shaft 201a and the fly-wheel 202 are rotating, the crank-pin 203 tends to move away from the axis 201 in the direction of the arrow $f$, against the action of the spring 206, this movement increasing as the speed of the driving shaft 201a increases. The crank-pin 203 then actuates the alternative crank-arm 212 which controls the casing 227 of the free-wheel 213, the cage 230' of which is connected to the driven shaft or output shaft by a torsion bar 223 coupled for rotation with the said cage by the flutings 231, as will be further explained below.

It will be observed that in this arrangement, the free-wheel is directly operated by the alternating member, the elastic member 223 being connected directly or through gears to the output shaft or constituting this shaft itself. In the case in which there are a number of crank-arms 212 actuated by the crank-pin 203, as has been described for example with reference to FIGS. 4 and 5, the presence of a free-wheel driven by each crank-arm and an elastic member following each free-wheel, provides a transmission without shocks or jerks to the receiving shaft. In addition, the elastic member is given a non-uniform movement of rotation instead of being driven by an alternating motion, as in the case in which it is interposed between the alternating member and the free-wheel.

This new arrangement has several constructive advantages, in particular due to the fact that the free-wheel or wheels, which are generally fairly bulky mechanical parts are brought close to the alternating device, which concentrates all the mechanical parts in the same place, whilst the elastic devices on their side can work outside the casing in which the other parts are enclosed. In addition, the driving parts of the free-wheels have clearly-defined movements, since they are connected to the alternating devices, and this simplifies the design of the apparatus.

The active direction of rotation of the free-wheel 213 is in this case that shown by the arrow $f'$ corresponding to a thrust of the crank-arm 212. This crank-arm applies cyclic reactions to the crank-pin 203, first in one direction and then in the other, but these are on the average small in the radial direction; these radial reactions tend to modify the eccentricity of the crank-pin 203 with respect to the entry shaft 201a and are cancelled out by a shock-absorber or dash-pot which in this case is located inside the spring 206. It will be seen that the rod of the piston 209' of the dash-pot is an extension of the rod 209 which carries the cup on which the spring 206 acts. The piston 209' slides in a fluid-tight cylinder 214 filled with oil and it is pierced to form a port.

It is to be observed that if this same crank-pin 203 actuated a number of crank-arms such as 212, each acting on a free-wheel and an elastic member, uniformly spaced apart with respect to each other, the dash-pot could be dispensed with. Symmetrically placed with respect to the axis 205 is mounted a further shaft 215 around which oscillates a further arm 216 which is subjected to a further spring 217. The centre of gravity of this arm is displaced with respect to the shaft 215 and is symmetrical with that of the arm 204 with respect to the axis 201, so that during the rotation of the driving shaft 201a, the arm 216 tends to pivot in the direction of the arrows around the shaft 215. The two arms 204 and 216 are coupled together by a crank-arm 218. The presence of the arm 216 makes it possible for the whole of the masses of the moving system carried by the fly-wheel 202 to be statically and dynamically balanced at all speeds of rotation.

The spring 206 is generally mounted with a tension other than nil at rest, in order that the crank-pin 203 may not move away from its axial or neutral position into an eccentric position, except at the so-called idling speed of the engine.

If, for reasons of safety (in the case of a vehicle for example) it is desired to have a control at the disposal of the driver of passing into neutral position, it will for example only be necessary to arrange inside the spring 217 a jack on the piston 219 on which will act the oil under pressure derived for example from the lubricating circuit of the engine, in order to force and lock the crank-pin 203 against its rest abutment 203a. The oil controlled at the intake by the valve 220, will pass through a journal bearing 220a and a groove 220b in the shaft 201 and the fly-wheel and will terminate in the conduit 221 under the piston 219.

This manual control may in addition be combined with the hand brake control of the vehicle by coupling the valve 220 to the hand brake in such manner that the valve is open and the oil is permitted to act under the piston 219 when the hand brake is applied.

With the question of safety, there is bound up the limitation of the torque transmitted. This is a maximum when the speed of the output shaft is zero and the eccentricity of the crank-pin is a maximum. In this case, the incidence of fatigue is a maximum in the whole of the transmission and in particular in the elastic system comprising the torsion bar 223. By limiting this fatigue and therefore the torque, the life of the system may be increased or the dimensions of the elastic member may be reduced, that is to say the length of the torsion bar 223 in the example shown in FIGS. 5 and 7.

A limitation of the torque of this kind is sometimes obtained simply by the characteristics of the receiver member (a vehicle, the driving wheels of which can skid). There may however also be provided a limiter device of the friction plate type 222, 222a which is known per se, placed for example between the torsion bar 223 and the driven member. This limiter device may also be placed close to the free-wheel or combined with the free-wheel, provided that means are taken to dissipate the heat developed.

A further solution which is applicable to the cases already described, in which the amplitude of the alternating motion is variable, consists in limiting this amplitude which involves a limitation of the torque. When this amplitude increases automatically at the same time as the speed of rotation of the engine, over a certain range of this speed, it is possible simply to place on the output shaft of the converter an indicator of speed of rotation or an inertia-type regulator of known kind, this being caused to act on the engine so as to limit its power and therefore its speed of rotation, the amplitude being thereby reduced to the desired values as long as the speed of the output shaft is not sufficient. In the case of a petrol engine, this regulator would act on a special butterfly valve disposed in the admission pipe, or on the position of the accelerator stop member.

A further solution, adapted to the device shown in FIGS. 5 and 7, consists in causing the regulator to act directly on the amplitude of the alternating motion in order to reduce this amplitude if the speed of the output shaft is not sufficient, or in limiting the said amplitude by means of a stop member.

This problem can be resolved by means which may be readily deduced from those which permit of an "overdrive" effect which will be referred to later.

For the same torque transmitted, the ratio between the output and the input speeds of the converter will increase as the amplitude of the alternating motion increases. In increasing this amplitude, an effect is thus obtained similar to that which is produced with ordinary gear-boxes in the gear known as "overdrive." In a torque converter in which the eccentric crank-pin has a constant eccentricity, the overdrive effect could be obtained by coupling the alternating crank-arm to the free-wheel by a lever arm having a variable length.

In an apparatus such as that shown in FIGS. 5 and 7, in which the crank-pin 203 has a variable eccentricity, in accordance with the speed of the entry shaft 201a, there is the advantage that the overdrive can be obtained simply by displacing the point of balance of the crank-pin so that for the same speed of the entry shaft 201a, the crank-pin is moved further away from the central axis 201. For that purpose, a weight-head on the arm 204 could be moved so as to increase, all other things being equal, the centrifugal force and the eccentricity of the crank-pin.

In the form of construction shown in FIGS. 5 and 7, it has been thought preferable to put into action a force which reduces that due to the springs 206 and 217.

For this purpose, the oil jack 219 is used. By causing this jack to compress the spring 217 by means of oil arriving at 224, a valve 225 (the conduit 221 being then of course put to exhaust) the force of the spring 217 is reduced, this force being opposed, in the same way as the spring 206, to the action of centrifugal force. Due to this fact, the eccentricity of the crank-pin increases and produces an overdrive effect.

This manual control of the overdrive may be associated with the speed indicator or regulator mounted on the output shaft which has been referred to above, with the object of preventing the overdrive as long as the speed is less than a certain value.

Reversing may be obtained either by a gear-box or by reversal of the direction of operation of the free-wheel, which is easy when the free-wheel device is formed by a hydraulic transmission.

In the device shown diagrammatically in FIGS. 5 and 7, two free-wheels are used in combination: one of these 213 gives forward running and the other 226 acts as a reversing gear. Both are mounted inside the same oscillating casing 227 controlled by the crank-arm 212. The position of the free-wheels in this casing is determined by a jack 228 which can only put one free-wheel in engagement at a time.

In the position shown, the free-wheel 213 for forward running is in engagement while the free-wheel 226 is out of action, being mounted inside a ring 227a which turns freely inside the casing 227; when the piston 29 is pushed towards the left, the free-wheel 213 moves into the disengaged position which is occupied in FIG. 7 by the reversing free-wheel 226, whilst the latter comes into the operative position, in order to use the other part of the oscillating movement of the crank-arm 212, and therefore to drive the shaft 223 in the direction of the arrow $f''$.

In order to permit of this movement, the cage 230, 230', in which are disposed the inclined planes of the rollers, carries internal flutings 231 which can slide along the head 232 of the torsion bar 223 which forms the output shaft of the torque converter. The power-utilising member being thus coupled to the engine by a free-wheel, there is no possibility of braking action by the engine. In order to obviate this, it is possible to provide a slowing-down device or a progressive brake coupled to the output shaft, and which may be controlled by the accelerator pedal of the vehicle.

In the case of a hydraulic system, this braking effect may be readily obtained by reducing the section of the outlet channel of the receiver. In the other free-wheel systems, a special slowing-down device may be provided, for example of the electro-magnet type such as that shown at 233 in FIG. 7, utilising in known manner the eddy currents generated in a rotating disc.

There will be indicated later a further means which enables a certain coupling to be retained between the receiving member and the engine.

In order to relieve the elastic mmeber, it may also be made double-acting by causing it to drive two free wheels having opposite directions of rotation and coupled through suitable gearing with the output shaft. In this way, each half period of operation of the system will be a driving period, and the elastic system transmits a higher and more equally distributed power during the period. This is especially valuable at high speeds of the output shaft when the deflections of the elastic system remain small. At very low speeds of the output shaft on the other hand, the maximum torque transmitted is not changed.

If a step-up gearing effect is provided between the driving shaft and the torque converter, this advantageous arrangement enables, all other things being equal, the dimensions and the weight of the converter to be reduced, and more particularly the overall size of the elastic member.

In the statement of claim which follows, by the term

"free-wheel device" is meant a device which permits the return movement of the member producing the alternating motion, this device being thus capable of assuming various forms, for example purely mechanical or hydraulic.

What we claim is:

1. A coupling gear for driving a rotary output shaft subject to variable resistance torques, from a rotary motive input shaft, comprising a motion converter including an eccentered crank-pin driven in rotation by said input shaft and a crank-rod connected to said crank-pin, for transforming the rotary motion applied at one end of said converter into reciprocating motion available at the end of said crank-rod, means associated with said converter for gradually varying the eccentricity of said crank-pin between zero and a maximum value during the operation of said motion converter, a rest abutment limiting the movement of said crank-pin when said eccentricity is zero, and a transmission between said reciprocating crank-rod and said output shaft, said transmission including a free-wheel system and at least one torsion bar capable of elastic distortion under the action of the resistance torques applied to said output shaft, and the return movement of which is free as soon as the value zero of the amplitude is overtaken so that said torsion bar restores entirely on the driving shaft the part of the distortion which has not been transmitted to the driven shaft.

2. A coupling gear as claimed in claim 1 wherein the motion converter comprises a fly-wheel fast with said input shaft, a member displaceable in said fly-wheel and driven in rotation by said input shaft through the intermediary of said fly-wheel, said crank-pin being fast with said member and projecting from said fly-wheel through a passage allowing displacement of said crank-pin from a position determined by said rest abutment and in which said eccentricity of said crank-pin is zero, and control means for adjusting the position of said member in said recess against the centrifugal effect.

3. Coupling gear as claimed in claim 2 wherein the member adjusting means is hand-actuated.

4. Coupling gear as claimed in claim 2 wherein the member adjusting means is automatically-actuated.

5. Coupling gear as claimed in claim 4 wherein the member adjusting means is under the control of the rotation velocity of the input shaft.

6. Coupling gear as claimed in claim 1 comprising a number of free-wheel systems connected with the output shaft, an equal number of crank-rods connected with the crank-pin and distributed thereabout, and a resilient-section transmission between each crank-rod and free-wheel system.

7. Coupling gear as claimed in claim 2 wherein the input shaft, output shaft and fly-wheel are substantially coaxial.

References Cited in the file of this patent

UNITED STATES PATENTS

| | | |
|---|---|---|
| 687,566 | Johnson | Nov. 26, 1901 |
| 771,928 | Pearson | Oct. 11, 1904 |
| 835,197 | Parkes | Nov. 6, 1906 |
| 1,995,333 | Svensson | Mar. 26, 1935 |
| 2,023,579 | Dodge | Dec. 10, 1935 |
| 2,257,854 | Peterson | Oct. 7, 1941 |
| 2,319,485 | Alabrune | May 18, 1943 |

FOREIGN PATENTS

| | | |
|---|---|---|
| 19,387 | Great Britain | Sept. 8, 1904 |
| 506,876 | France | June 8, 1920 |
| 184,447 | Great Britain | Nov. 9, 1922 |
| 578,372 | France | July 1, 1924 |
| 211,110 | Great Britain | June 15, 1925 |
| 111,437 | Switzerland | Aug. 17, 1925 |

OTHER REFERENCES

Deetjen: D6077, Oct. 6, 1955, K147123 (German printed application, 3 pgs. spec., 1 sht. dwg.).